(12) United States Patent
Lockwood

(10) Patent No.: US 8,011,172 B2
(45) Date of Patent: Sep. 6, 2011

(54) ENGINE ARRANGEMENT

(75) Inventor: Clive Lockwood, Derby (GB)

(73) Assignee: Rolls-Royce PLC (GB)

( * ) Notice: Subject to any disclaimer, the term of this patent is extended or adjusted under 35 U.S.C. 154(b) by 811 days.

(21) Appl. No.: 11/869,796

(22) Filed: Oct. 10, 2007

(65) Prior Publication Data

US 2008/0092516 A1     Apr. 24, 2008

(30) Foreign Application Priority Data

Oct. 21, 2006 (GB) .................................. 0621001.7

(51) Int. Cl.
*F02G 3/00* (2006.01)

(52) U.S. Cl. ............... 60/39.093; 244/134 R; 244/53 B; 60/785; 137/15.1

(58) Field of Classification Search ........... 60/782, 60/785, 39.093; 244/134 B, 134 C, 134 R, 244/53 B; 137/15.1; 415/144, 176
See application file for complete search history.

(56) References Cited

U.S. PATENT DOCUMENTS

| | | | |
|---|---|---|---|
| 2,469,375 A | 5/1949 | Flagle | |
| 4,419,045 A | 12/1983 | Andre et al. | |
| 4,738,416 A * | 4/1988 | Birbragher | 244/134 B |
| 4,757,963 A * | 7/1988 | Cole | 244/134 B |
| 4,822,244 A * | 4/1989 | Maier et al. | 416/95 |
| 4,831,819 A * | 5/1989 | Norris et al. | 60/39.093 |
| 4,897,020 A * | 1/1990 | Tonks | 415/115 |
| 5,011,098 A * | 4/1991 | McLaren et al. | 244/134 B |
| 5,088,277 A * | 2/1992 | Schulze | 60/39.093 |
| 5,623,821 A * | 4/1997 | Bouiller et al. | 60/39.093 |
| 5,707,206 A * | 1/1998 | Goto et al. | 415/173.1 |
| 5,782,077 A * | 7/1998 | Porte | 60/782 |
| 6,231,301 B1 * | 5/2001 | Barnett et al. | 415/57.4 |
| 6,244,817 B1 * | 6/2001 | Ngo | 415/119 |
| 6,698,691 B2 * | 3/2004 | Porte | 244/134 B |
| 7,055,304 B2 * | 6/2006 | Courtot et al. | 60/39.093 |
| 2003/0035719 A1 | 2/2003 | Wadia et al. | |
| 2005/0109011 A1 * | 5/2005 | Courtot et al. | 60/39.093 |

FOREIGN PATENT DOCUMENTS

JP      63248931     10/1988

* cited by examiner

*Primary Examiner* — William Rodriguez
(74) *Attorney, Agent, or Firm* — McCormick, Paulding & Huber LLP

(57) ABSTRACT

An engine arrangement for a component subject to icing. The arrangement comprising a manifold as part of a flow path incident upon a heated component. The manifold including holes to create jets having an exit angle toward the component subject to icing. The jets of hot gas are entrained in a core flow passing through the main flow path before washing over a desired incident area of the component. The exit angle and spacing between the jet and the component are determined to reduce disruption of the core flow and/or provide the desired incident area on the component and/or use the minimum amount of hot air.

12 Claims, 2 Drawing Sheets

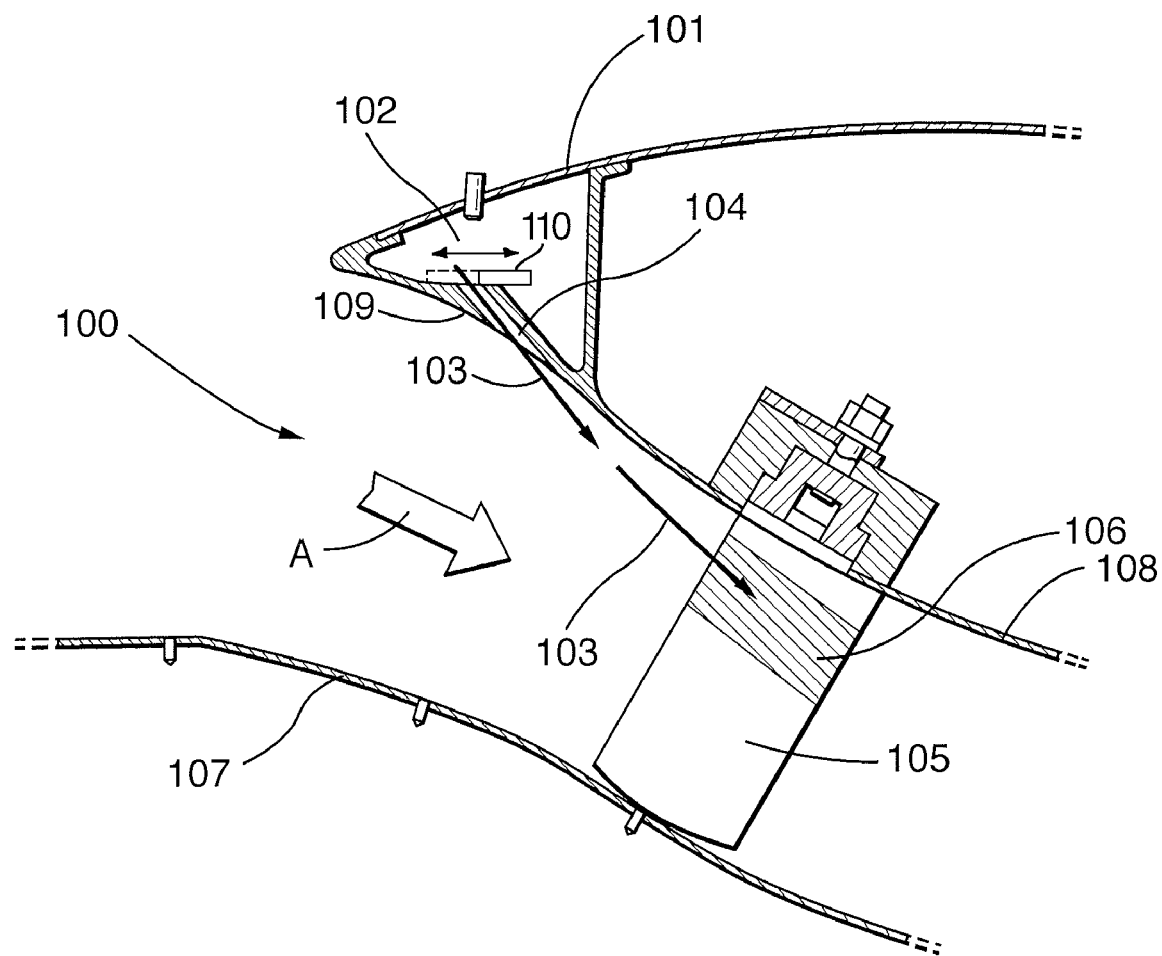

ns along the flow path so that the hot air jet is entrained in that flow before washing over the component. By such an approach it will be appreciated that heat exchange between the hot air jet and the component is through the core flow rather than direct. In such circumstances there will be less disruption of the core flow than if the hot air was directly injected over the component which may cause core flow disruption and potentially erosion as well as heating as required.

ENGINE ARRANGEMENT

CROSS-REFERENCE TO RELATED APPLICATION

This application is entitled to the benefit of British Patent Application No. GB 0621001.7 filed on Oct. 21, 2006.

FIELD OF THE INVENTION

The present invention relates to engine arrangements and more particularly to gas turbine arrangements including components such as vanes and struts which may be subject to icing.

BACKGROUND OF THE INVENTION

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts.

In view of the above it will be appreciated that certain parts of the engine 10 and in particular the low pressure compressor stages of that engine may be subject to icing on components such as guide vanes. In appropriate atmospheric conditions, icing of components may occur at any time when the engine is running, that is to say in use. This includes ground running, at idle or at higher engine speeds, as well as operation in flight. In such circumstances ice may build up on these guide vanes, which will then eventually be shed potentially causing damage to subsequent parts and stages of the engine 10. In order to avoid such ice build-up it has been known for hollowing of these components to be provided in order that hot air from the combustor or other stages of the engine can then be used to warm the component and therefore prevent ice build-up. Unfortunately hollow components increase engine complexity and therefore production costs and so result in extended manufacturing timescales. Furthermore, components which move or rotate add additional complexity and potential leakage through the need to provide hot air flow through a rotating spindle to the component for heating to avoid icing on that component.

SUMMARY OF THE INVENTION

In accordance with aspects of the present invention there is provided an engine arrangement for a component subject to icing in use, the arrangement comprises a manifold that includes a hole to create a jet having an exit angle toward a component subject to icing, the jet of hot gas is entrained in use in a core flow passing through the main flow path before washing over a desired incident area of the component, the exit angle and/or spacing between the jet and the component are determined to reduce disruption of the core flow and/or provide the desired incident area upon the component and/or use the minimum amount of hot air.

Typically, the component is a vane or strut.

Typically, the desired incident area is to limit ice formation to below a maximum size.

Generally, the exit angle and/or spacing is to ensure the hot gas flow has sufficient heat for heating the desired incident area above an icing temperature.

Generally, the jet comprises multiple jets created by a plurality of holes. Possibly, the holes are tapered. Additionally, the holes are round or oval or slots. Possibly, the holes are symmetrically distributed about the manifold. Advantageously, the holes are adjustable in size.

Possibly, the exit angle of the jet at different parts of the manifold is different.

Possibly, the manifold is part of an annular structure of the engine arrangement.

Possibly, the hot gas flow is stratified as a substantially laminar flow adjacent to a wall part of the flow path.

BRIEF DESCRIPTION OF THE DRAWINGS

FIG. 2 is a simplified schematic illustration in cross section of an engine arrangement in accordance with the present invention.

Figure 1:
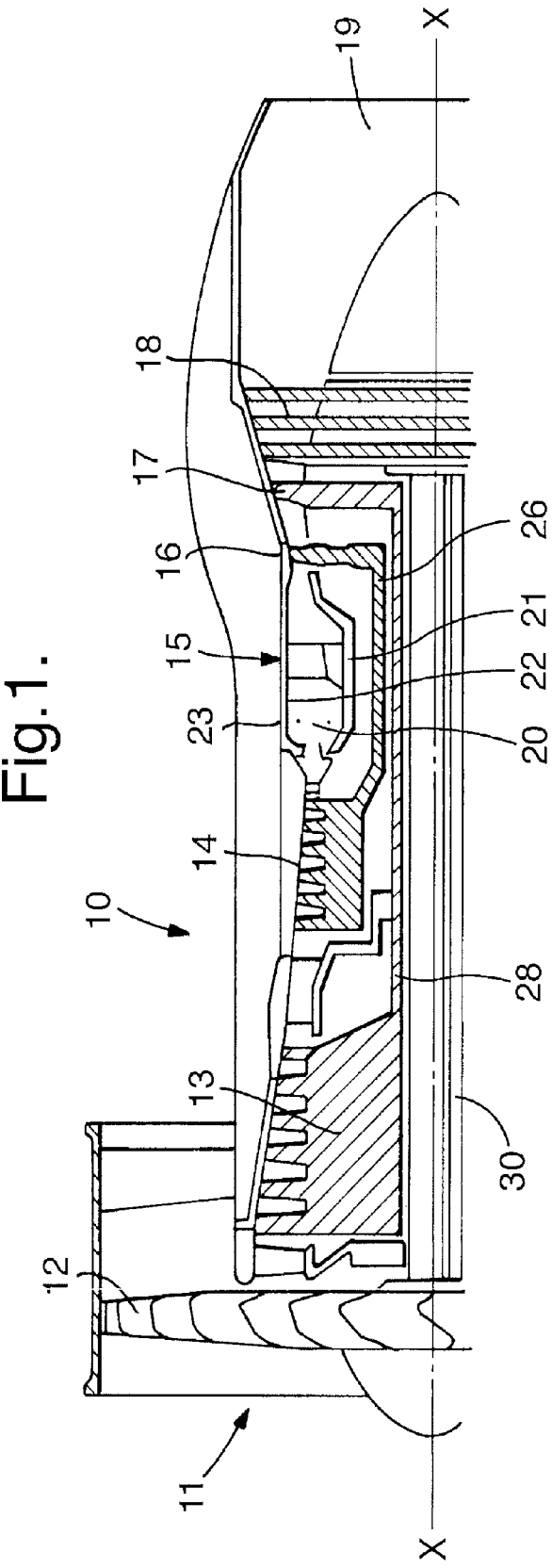
FIG. 1 is a simplified schematic illustration of a portion of a gas turbine engine of the present type.

DETAILED DESCRIPTION OF THE PREFERRED EMBODIMENTS.

An embodiment in accordance with aspects of the present invention will now be described by way of example only and with reference to the accompanying drawing, FIG. 2 illustrating a part-schematic cross-section of an engine arrangement.

As indicated above, certain components in engines such as gas turbine engines may be subject to icing as a result of their position within a flow path through the engine. These components may take the form of vanes or struts within ducting which forms the flow path. This icing will build upon the component until shed when lumps of ice may create problems in subsequent parts of the engine. Clearly and ideally ice should be limited from forming at all but this will generally be impractical. It will be understood that overall engine efficiency must be considered and therefore a balance struck between conflicting objectives for de-icing or preventing icing with as little energy as possible but without disruption or erosion of the normal core flow through the flow path in the engine, which provides thrust.

As indicated above, a key objective with regard to component heating is to prevent creation of ice lumps which may damage components in subsequent stages of the engine. In such circumstances, heating sufficient to prevent formation of such unacceptable sized ice lumps will be adequate. Heating of the whole or most of the component may not be necessary.

In accordance with aspects of the present invention, hot air is supplied to a manifold upstream of the component. This manifold is generally an annular section of the engine flow path ducting. The hot air exits the manifold through appropriate holes or slots creating jets into a core flow which passes along the flow path. The jet or jets are at an exit angle aligned with the core flow. In such circumstances the hot air flow impinges upon the downstream vane over a desired incident area in order that that incident area is rendered ice free. By such an approach icing on the remainder of the component will only create when shed ice lumps of a size sufficiently small not to cause damage to subsequent parts and components of the engine downstream of the component.

FIG. 2 illustrates an engine arrangement 100 in accordance with aspects of the present invention as a part cross-section. Thus, the arrangement 100 includes a manifold 101 which defines a hollow space 102 which is fed with hot air from an appropriate part of the engine, such as the high pressure (HP) compressor. The manifold 101 extends around the circumference of the engine as indicated in an annular duct and generally therefore presents a hot air flow 103 through a set of holes 104 into a core flow in the direction of arrowhead A. This core flow A acts as part of the power stream within the engine and therefore disruption of this core flow A will affect performance and efficiency of the engine. In such circumstances the jet 104 is presented at an exit angle such that the hot air jet 103 generally remains entrained within, rather than mixing with, the core flow A to prevent disruption of that flow A and therefore a reduction in engine efficiency.

The hot air flow 103 impinges upon a component 105 over an area defined as the incident area of the component 105. This incident area is shown schematically as cross-hatching 106 in FIG. 2.

The hole 104 may be a substantially continuous channel about the circumference of the manifold 101 or comprise more normally a plurality of holes which may be round or oval or slotted as required in order to create the desired gas flow 103 and therefore impingement area 106 on the component 105. It will be understood that in order to maintain entrainment of the hot air flow 103 not only the exit angle of the jet 104 but also the distance of the holes 104 from the component 105 must be pre-determined for a desired incident area 106 size and location.

As illustrated in FIG. 2 the component 105 may comprise a vane in a flow path defined by an inner duct wall 107 and an outer duct wall 108 through which the core flow A passes. In such circumstances, as illustrated, the manifold 101 and the holes 104 therefore define part of the outer duct wall 108 of the flow path. However, where desirable, or necessary, the manifold and jets in accordance with aspects of the present invention may be formed as part of the inner duct wall 107. In such circumstances the desired incident area upon the component can be as illustrated in FIG. 2, that is to say upon an outer part of the component 105 or an inner part of a component in accordance with aspects of the present invention in order to prevent icing.

As indicated above, generally the hot air flow 103 will be arranged such that disruption in the core flow A is minimised. In such circumstances the jet 104 will have an exit angle which is aligned with the direction of the core flow A and the spacing between the hole 104 and the component 105 relatively short such that the hot air flow 103 can substantially remain a separate entrained part of the general flow through the flow path defined by the walls 107, 108. By such isolation in addition to reducing disruption in the core flow A it will also be understood that the heating function of the hot air flow 103 is sustained, the hot air will be less diluted with cold air.

The purpose of the hot air flow 103 as indicated is to inhibit and prevent icing within the incident area 106. In such circumstances, the remaining parts of the component 105 may be subject to icing in operation but such icing will produce ice lumps if shed of such a size below that which would cause damage within subsequent parts or stages of an engine incorporating the arrangement 100. The actual size of the incident area 106 will vary dependent upon requirements and as indicated a desire to inhibit disruption effects upon the core flow A.

By maintaining separation of the hot air flow 103 it will be appreciated as indicated that mixing is reduced and so the quantity of hot air required in order to prevent icing in the incident area 106 reduced. It will also be understood that in comparison with prior arrangements only part of the component 105 is heated and therefore there are overall efficiency benefits with regard to engine arrangements 100 in accordance with aspects of the present invention. The present arrangement will generally utilise less hot air in comparison with previous systems and therefore energy is not lost to overall engine efficiency. It will also be understood by providing a simple hole 104 in a manifold 100 problems with respect to providing a hollow structure within the component 105 as well as appropriate couplings to deliver hot air to an internal heating structure within the component 105 are removed.

As illustrated in FIG. 2, the component 105 can comprise a moveable vane but alternatively could comprise a stationary vane or strut utilised for core flow A guiding or simply to maintain spacing of the duct walls 107, 108 in order to define the flow path necessary for that core flow A to pass through the arrangement 100 and the engine.

The incident area 106 required for each component will differ dependent upon position within the engine and other factors. In such circumstances the hole 104 as indicated may take the form of separate discrete holes distributed about the manifold 101. These holes to form the jets 104 may be symmetrically and evenly distributed about the manifold 101 or be concentrated in terms of number or shape of hole dependent upon particular incident downstream component position. It will be understood that in a typical engine, components such as vanes or struts may be distributed variously about the circumference with different spacing between vanes and between each component. In such circumstances holes 104 in accordance with aspects of the present invention may be positioned directly upstream of those components with spacing between holes 104 matched to component spacing. In such circumstances areas between the components will not be impinged by hot gas flows in accordance with aspects of the present invention and therefore flow choking effects upon the core flow A limited. However, these areas between components may also be subject to icing so presentation of a hot gas flow film adjacent to them may be beneficial.

Typically, the holes 104 in accordance with aspects of the present invention will be simply formed and have an exit angle as described in order to achieve the desired presentation of the hot air flow 103 to the component 105. However, where desirable, the holes creating the jets 104 may be tapered to concentrate the hot air flow in accordance with aspects of the present invention to more specific impingement upon the component 105.

Generally the hot air within the hollow 102 in accordance with aspects of the present invention will be partially pressurised in order to drive hot air flow 103 out of the holes 104 towards the component 105. However, it will also be understood that through Venturi effects the core flow A may draw hot air flow 103 through the hole 104 for desired flow 103 direction towards the component 105. It will also be understood that an upstream part 109 of the hole 104 may be appropriately aerodynamically smoothed and curved to extend slightly inward upon the core flow A to create a slight chute effect again to appropriately present the hot air flow 103 for minimum turbulence and greater direction towards the incident area 106. It will also be understood when de-icing is not required the holes 104 may be closeable, for example by a movable shutter apparatus 110 of the type as known to those skilled in the art (see for example movable shutter 7 shown in FIG. 1 U.S. Pat. No. 4,419,045), to further limit any potential detrimental effects with regard to turbulence to the core flow diminishing overall engine efficiency.

Components partially heated in accordance with aspects of the present invention as illustrated in FIG. 2 may take the form of rotatable vanes or fixed vanes within a gas turbine engine. The core flow A may be the main power core flow, that is to say a low pressure compressor flow, within a gas turbine engine or a bypass stream flow within a gas turbine engine where that core flow may create icing upon components within the engine. It will also be understood aspects of the present invention may be utilised in other situations where components are subject to icing such as other areas of an aircraft or rockets or missiles or arctic equipment or other situations where de-icing/removal of incidental of ice is problematic.

As indicated, aspects of the present invention teach towards heating only part of the component in order to prevent ice formation on that part of the component and therefore limiting deposited ice on other parts of the component to a size below that which may cause damage to subsequent parts of the engine. In such circumstances, more efficient and optimised use of available heat is achieved and therefore an overall reduction in the amount of hot air flow and therefore thermal usage required for inhibiting deposition and achieving de-icing is utilised. In such circumstances, where appropriate, manifolds can be created upstream.

Aspects of the present invention may also be used with regard to components for marine or automated use in cold climates to protect turbo/superchargers downstream of the components which may be subject to icing and therefore may release or shed ice to the intake ducting for such turbo/superchargers. In such circumstances, the struts in the intake ducting for the turbo/superchargers may be components subject to icing and therefore provision of an arrangement in accordance with aspects of the present invention may be advantageous. It will also be understood that shafts and other rotating components may be damaged by shed ice and therefore provision of an arrangement in accordance with the present invention to limit ice shed dimensions may be advantageous.

Modifications and alterations to the embodiment of aspects of the present invention described above will be appreciated by those skilled in the art. Thus, for example, it is the heating flow to core flow contact area between the core flow and the hot gas flow in accordance with aspects of the present invention which is important in order to prevent disruption of that core flow. Thus, one side of the hole 104 may be smooth in order to maintain a smooth contact zone between the flows whilst the other side of the hole 104 may include ribs to create some turbulence in parts of the gas flow away from the contact flow to facilitate heating of the incident area 106. Similarly, parts of the duct wall may also be ribbed or shaped to create some turbulence in the hot gas flow away from areas of that flow which may contact the core flow.

I claim:

1. An engine arrangement for de-icing a component subject to icing in use, the arrangement comprising an annular structure defining a main flow path, the component subject to icing being disposed within the main flow path, the annular structure further defining a manifold containing hot gas, the manifold including a hole to direct a jet of the hot gas at an exit angle toward the component subject to icing, the jet of hot gas being entrained in use in a core flow passing through the main flow path before washing over a desired incident area of the component, the exit angle and spacing between the jet and the component being determined to reduce disruption of the core flow and/or provide the desired incident area on the component and/or use the minimum amount of hot gas.

2. An arrangement as claimed in claim 1 wherein the component is a vane or strut or shaft.

3. An arrangement as claimed in claim 1 where the desired incident area is defined to limit ice formation to below a maximum size when shed.

4. An arrangement as claimed in claim 1 wherein the exit angle and spacing are determined to ensure the hot gas flow has sufficient heat for heating the desired incident area above an icing temperature.

5. An arrangement as claimed in claim 1 wherein the jet comprises multiple jets created by a plurality of holes.

6. An arrangement as claimed in claim 5 wherein the holes are tapered.

7. An arrangement as claimed in claim 5 wherein the holes are round and/or oval and/or slots.

8. An arrangement as claimed in any of claim 5 wherein the holes are symmetrically distributed about the manifold.

9. An arrangement as claimed in claim 5 wherein the holes are closeable.

10. An arrangement as claimed in claim 1 wherein the manifold is at an inlet part of the annular structure.

11. An arrangement as claimed in claim 1 wherein jets are provided to ensure the hot gas flow is stratified as a substantially laminar flow adjacent to a wall part of the main flow path.

12. A gas turbine engine incorporating an engine arrangement as claimed in claim 1.

* * * * *